(No Model.)
H. G. MILLER.
LAWN MOWER.
No. 412,970. Patented Oct. 15, 1889.
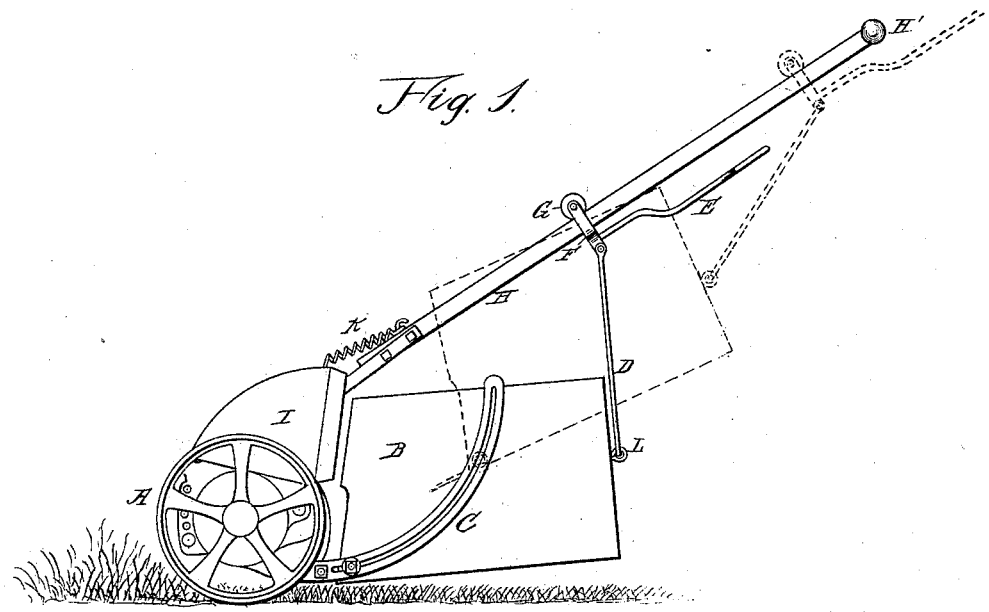
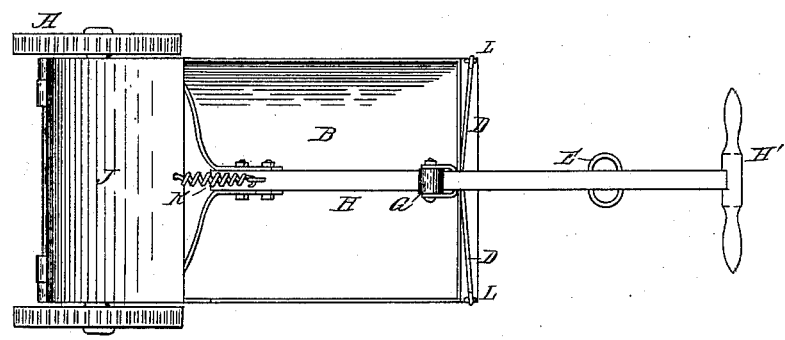

UNITED STATES PATENT OFFICE.

HORACE G. MILLER, OF MOUNT VERNON, IOWA.

LAWN-MOWER.

SPECIFICATION forming part of Letters Patent No. 412,970, dated October 15, 1889.

Application filed July 6, 1889. Serial No. 316,702. (No model.)

*To all whom it may concern:*

Be it known that I, HORACE G. MILLER, a citizen of the United States, residing at Mount Vernon, in the county of Linn and State of Iowa, have invented certain new and useful Improvements in Lawn-Mowers; and I do hereby declare the following to be a full, clear, and exact description of the invention, such as will enable others skilled in the art to which it appertains to make and use the same.

This invention relates to a device for catching and carrying the grass cut by a lawn-mower; and it consists in certain improvements in a machine for that purpose described in the Letters Patent of Grant C. Miller, dated August 13, 1889, and numbered 409,056.

The full nature of these improvements and the objects to be attained by them will clearly appear in the description following.

In the accompanying drawings, forming a part of this specification, Figure 1 is a side elevation of a machine embodying my invention, and Fig. 2 a plan view of the same.

Similar letters of reference indicate corresponding parts.

In the drawings, A refers to the lawn-mower, which may be of any well-known type, and need not be particularly described. To the rear of the finger-bar of the mower a box B is mounted on slotted arms C, and is adapted to catch the grass as cut off and thrown back. To facilitate this, the mower is provided with a hood J. The arrangement and construction of these parts being fully described in the application referred to need not be set forth in detail. An improvement in this part of the machine consists in the addition of end pieces I I to the hood, to prevent the grass from being thrown out to the side of the machine.

A further improvement consists in the construction of the device for tilting the box, and this will now be described. To the rear end of the box B is hung a bail consisting of two rods D D, connecting with the box by suitable eyes L L and converging at the upper end, where they are pivotally connected with a stirrup F, to which is secured a backwardly-extending handle E. This handle is normally considerably forward of the handle-bar of the mower H', thus making it convenient for the operator holding the handle-bar with one hand to draw backwardly and upwardly the box, as indicated by the dotted lines, and so dump the contents. In order to make this operation as easy as possible, the stirrup is provided with a roller G, which rides on the upper side of the handle H. The construction is such as not only to admit of easy operation in dumping, but to allow the box to slip quickly and of its own gravity into the normal position.

A further improvement consists in the application of a spring-connection between the hood J and the handle H. For this purpose I use a simple coil-spring K. This holds the hood in proper position at all times, and at the same time permits the handle to be depressed without uncoupling from the said hood.

Having thus described my invention, what I claim as new, and desire to secure by Letters Patent, is—

In a grass-gathering device for lawn-mowers, the combination, with the mower, of the slotted segmental arms C, the box B, suspended therefrom by suitable bolts or studs, the bail D, connected to the opposite end of the box, the stirrup F, pivotally connected with the upper extremity of the bail and having the rearwardly-extending handle E, the mower-handle H, and the roller G, mounted in said stirrup and adapted to ride on said handle H, all substantially as and for the purpose set forth.

In testimony whereof I affix my signature in presence of two witnesses.

HORACE G. MILLER.

Witnesses:
S. W. BRAINERD,
FRANK G. CLARK.